United States Patent [19]

Gallup

[11] Patent Number: 5,167,834
[45] Date of Patent: * Dec. 1, 1992

[54] PROCESS FOR TREATING NITRITE-AND SULFIDE-CONTAINING WATER TO REDUCE NITROGEN OXIDE AND HYDROGEN SULFIDE EMISSIONS THEREFROM

[75] Inventors: Darrell L. Gallup, Chino; John L. Featherstone, El Centro, both of Calif.

[73] Assignee: Union Oil Company of California, Los Angeles, Calif.

[*] Notice: The portion of the term of this patent subsequent to Jun. 18, 2008 has been disclaimed.

[21] Appl. No.: 575,325

[22] Filed: Aug. 30, 1990

Related U.S. Application Data

[63] Continuation-in-part of Ser. No. 226,039, Jul. 29, 1988, Pat. No. 5,061,373, Ser. No. 345,177, May 1, 1989, Pat. No. 5,032,284, and Ser. No. 473,226, Feb. 12, 1990, Pat. No. 5,024,769, which is a continuation-in-part of Ser. No. 345,177, , and a continuation-in-part of Ser. No. 226,039.

[51] Int. Cl.$^5$ .............................................. C02F 1/76
[52] U.S. Cl. ..................... 210/747; 210/755; 210/763; 210/764; 210/903; 210/916; 423/398; 423/571; 423/DIG. 19
[58] Field of Search ............................ 60/641.2, 641.5; 210/696, 698, 747, 752, 755, 758, 763, 764, 903, 916, 761, 762; 252/187.1, 187.2, 187.33, 187.34; 423/224, 235, 237, 544, 571, 395, 396, 398, DIG. 19

[56] References Cited

U.S. PATENT DOCUMENTS

| | | | |
|---|---|---|---|
| 3,340,182 | 9/1967 | Berkman et al. | 210/903 |
| 3,753,675 | 8/1973 | Young | 423/396 |
| 4,455,287 | 6/1984 | Primack et al. | 210/764 |
| 4,564,458 | 1/1986 | Burleson | 210/761 |
| 4,751,005 | 6/1988 | Mitsui et al. | 210/762 |
| 4,861,497 | 8/1989 | Welch et al. | 210/762 |
| 4,863,705 | 9/1989 | Epperly et al. | 423/235 |
| 5,024,769 | 6/1991 | Gallup | 210/764 |
| 5,028,340 | 7/1991 | Gallup | 210/764 |
| 5,032,284 | 7/1991 | Gallup et al. | 210/764 |
| 5,061,373 | 10/1991 | Gallup | 210/764 |

FOREIGN PATENT DOCUMENTS 5586584  6/1980  Japan ................................. 210/762

*Primary Examiner*—Robert A. Dawson
*Assistant Examiner*—Joseph Drodge
*Attorney, Agent, or Firm*—Gregory F. Wirzbicki; Clark E. DeLarvin

[57] ABSTRACT

A process for abating the emission of hydrogen sulfide and nitrogen oxide from a condensate of steam, derived from a sulfide- and nitrite-containing geothermal brine, comprising introducing an oxidizing agent into the condensate in an amount less than that which would be required to directly oxidize all the sulfide and nitrite to sulfate and nitrate. The process optionally provides for periodically introducing a biocide into the condensate to control the growth of organism therein.

39 Claims, No Drawings

PROCESS FOR TREATING NITRITE-AND SULFIDE-CONTAINING WATER TO REDUCE NITROGEN OXIDE AND HYDROGEN SULFIDE EMISSIONS THEREFROM

CROSS-REFERENCE TO RELATED APPLICATIONS

This application is a continuation-in-part of U.S. Ser. No. 07/226,039 filed Jul. 29, 1988, now U.S. Pat. No. 5,061,373 U.S. Ser. No. 07/345,177 filed May 1, 1989, now U.S. Pat. No. 5,032,284 and U.S. Ser. No. 07/473,226 filed Feb. 12, 1990, now U.S. Pat. No. 5,024,769, which latter application is a continuation-in-part of said U.S. Ser. No. 07/345,177 and 07/226,039; all of said applications being incorporated herein, by reference thereto, in their entireties.

BACKGROUND OF THE INVENTION

1. Field of the Invention

The present invention relates generally to processes for controlling the emission of hydrogen sulfide and nitrogen oxides from, and the growth of organisms, such as bacteria and algae, in, open cooling towers and the like in which sulfide- and nitrite-containing waters are cooled.

2. Background Discussion

General processes by which geothermal brine can be used to generate electric power have, of course, been known for some time. Geothermal brine, having a wellhead temperature of over about 400° F. and a wellhead pressure of over about 400 psig, for example, can be flashed to a reduced pressure to convert some of the water or brine into steam. Steam produced in this manner is generally used in conventional steam turbine-type power generators to generate electricity.

Cooler, less pressurized, geothermal brine can be used in a closed-loop, binary fluid system in which a low-boiling point, secondary liquid is vaporized by the hot brine. The vapor produced from the secondary liquid is then used in a gas turbine-generator to generate electricity. The vapor from the turbine is recondensed and reused.

In both instances, the "used" geothermal brine is most commonly reinjected into the ground to replenish the aquifer from which it was extracted and to prevent ground subsidence. Reinjection of geothermal brine is also important to avoid the problems associated with the disposal of the large amounts of saline and usually highly-contaminated brine involved.

One of the many problems which has added significantly to the overall cost of producing electric power by the use of geothermal brines, relates to the emission of hydrogen sulfide. Although the amount of hydrogen sulfide contained in the separated/extracted steam and gas mixture usually varies from one brine source to another, levels of at leasts about 50 PPM (parts per million) are common. As an indication of the magnitude of this emission problem, at an assumed hydrogen sulfide concentration (in the steam) of about 50 PPM and for an assumed steam production rate of about 200,000 to 220,000 pounds per hour (the amount of steam typically obtained from a brine flow of about a million pounds an hour), nearly 50 tons of hydrogen sulfide gas are generated each year as an unwanted by-product.

Another problem which has added to the overall cost of producing electric power by the use of geothermal brines relates to the undesirable emission of nitrogen dioxide ($NO_2$) The nitrogen dioxide results from the oxidation of ammonia in the brine by naturally occurring bacteria therein which produce nitrites. Nitrites can also produce acids which are quite corrosive to the cooling system and disposal piping.

It is important that any new process for controlling nitrogen oxide and/or hydrogen sulfide emissions from, and the growth of organisms in, steam condensate handling portions of geothermal brine power plants not only be effective to avoid penalties for excessive emissions, but that it also be economical. If a process is effective for controlling such emissions and organism growth but is uneconomical, the process is of little practical use in an actual geothermal brine power plant.

SUMMARY OF THE INVENTION

According to the present invention, an effective and economical process is provided for controlling the emission of hydrogen sulfide and nitrogen oxides from, and optionally the growth of organisms in, a system for handling a flow of condensate of steam, derived from a sulfide- and sulfite-containing water. The process comprises contacting the water with a sufficient amount of an oxidizing agent to substantially prevent the emission of hydrogen sulfide and nitrogen oxides from the system. The amount of oxidizing agent generally used is substantially less than the stoichiometric amount which would be required to oxidize all the sulfides, sulfites, and nitrites to their corresponding sulfates and nitrates. Indeed, the amount used is generally substantially less than the stoichiometric amount required to oxidize either the sulfide or nitrite alone.

The preferred oxidizing agents are sold commercially as oxidizing biocides, but the amount used is so small it generally does not substantially inhibit the growth of any organisms, such as algae, bacteria and fungi, which might be in the water. When such organisms are present, the invention further provides for their control by contacting the water, in a periodic manner, with a sufficient amount of a biocide to substantially reduce the concentration of live organisms in the system.

As used herein the term "biocide" includes biostats (which stop or retard the growth of organisms such as bacteria algae and fungi without necessarily killing them), and therefore includes, without limitation, bacteriacides, bacteriastats, algicides, algistats, fungicides, and fungistats.

Also, "sulfide", "sulfite" and "sulfate" include the corresponding bisulfide, bisulfite and bisulfate, respectively.

Also as used herein, the expression "not substantially inhibit" means that the nominal growth rate of organisms, such as bacteria, fungi and algae, growing in the water, as observed prior to the addition of the oxidizing agent, is reduced less than about 10 percent after the biocide is applied, and "substantially reduce" means at least about 90 percent of the organisms are destroyed.

It has been found that the amount of oxidizing agent required to oxidize the sulfides, sulfites, nitrites and all other oxidizable species present is very small compared to the stoichiometric amount which theoretically would be required. Apparently, some catalytic effect is involved which produces the desired oxidation. Not only is the amount insufficient to oxidize all oxidizable species present in the water, but it is usually far less than that required to oxidize a single oxidizable species, i.e., sulfide ions (including bisulfide ions) or nitrite ions.

Typically, less than about 10 percent and, generally, less than about 1 percent of the stoichiometric amount of oxidizing agent needed to effect substantially complete oxidation of the sulfide or nitrite to sulfate or nitrate, respectively, is employed. In the case of geothermal brines, amounts within the range of about 0.01 percent to about 10.0 percent, and preferably within the range from about 0.2 percent to 2.0 percent of the stoichiometric amount, have been found to be highly effective. These amounts routinely result in the abatement of at least 50 percent, generally in excess of 80 percent, more often in excess of 90 percent, and frequently about 99 percent of both hydrogen sulfide nitrogen oxide emissions. Such abatement generally correlates, respectively, to at least a 50 percent, 80 percent, 90 percent and 99 percent conversion of sulfide and nitrite in the aqueous media to other species. Although it is believed that the emission abatement is directly related to the percent of oxidation of sulfide and nitrite to sulfate and nitrate, respectively, the invention is bound by neither this nor any other theory.

Among the oxidizing agents suitable for use in the present invention are those containing at least one

group, wherein X is a halogen.

A particularly preferred agent is selected from the group consisting of trichloro-isocyanuric acid and salts thereof, 1-bromo-3-chloro-5,5-dimethyl-hydantoin and salts thereof, and other halogenated substituted hydantoins, and mixtures thereof. The most preferred agent, on the basis of availability, cost and effectiveness, is trichloro-isocyanuric acid.

Generally, between about 0.5 and about 20 PPMW (parts per million by weight) relative to the water, and preferably between about 0.5 and about 5 PPMW, of the oxidizing agent is added, which, as pointed out above, is usually substantially less than the stoichiometric amount needed for the oxidation of sulfide and nitrite to sulfate and nitrate, respectively, but which, nevertheless, results in a substantial reduction in hydrogen sulfide and nitrogen dioxide emissions.

In some instances, the amount of oxidizing agent used may be sufficient to inhibit the growth of, or control the concentration of organisms in, the water. Generally, however, the preferred amounts of oxidizing agent utilized are so small that they are substantially ineffective as a biocide. Thus, the preferred amounts of oxidizing agent do not control or even substantially inhibit the growth of living organisms. Where such control is desired, an additional treatment is required. The additional treatment may comprise increasing the amount of oxidizing agent or the use of a non-oxidizing biocide.

Preferably, to control the growth of organisms in the water a biocide is added at periodic intervals. Typically, an amount sufficient to provide between about 25 and 200 PPMW of the biocide, relative to the water, is added, at intervals of about 1 week to about 4 weeks, to reduce the concentration of organism to below about 10,000 per liter.

The present invention is particularly useful in systems for handling a condensate of steam derived from a sulfide- and nitrite-containing geothermal brine.

DETAILED DESCRIPTION OF THE INVENTION

For convenience, the present invention will be described with respect to a particularly preferred application, namely, for a system in which a geothermal brine is used to generate electrical power. The brine typically contains significant quantities of oxidizable species including, among others, sulfides, sulfites, nitrites and their precursors. In such a system, brine from a geothermal well is first introduced into a zone of reduced pressure (flashed) to produce two phases, a gas phase and a liquid phase. The gas phase principally comprises steam along with a minor amount of non-condensable gases, both of which are passed through a steam turbine which drives a generator to produce electric power.

The effluent steam from the turbine is introduced into a condenser, in which at least some of the steam is condensed to form a condensate and from which the non-condensable gases are discharged. The condensate is circulated through at least one open cooling tower. Generally, the cooling tower will have associated therewith a condensate catch basin and a sump. Meanwhile, the liquid phase, referred to as the rejected brine, may be passed through one or more additional zones of reduced pressure to produce additional steam. Under ideal circumstances, the condensate and the rejected brine ultimately are combined in the sump for disposal by reinjection into a well.

During operation of the system, a sludge is formed in the cooling tower and catch basin. The sludge is the result of entrainment of air borne dust particles and air borne living organisms, the latter of which grow very rapidly in the hot, wet environment of the cooling tower and condensate catch basin. The sludge so formed also contains entrained steam condensate along with the various elements dissolved therein. For a more detailed description of geothermal brine processing and brine constituents, see, for example, METHOD FOR THE PRODUCTION OF USABLE STEAM AND NON-TOXIC SOLIDS FROM GEOTHERMAL BRINE, U.S. Pat. No. 4,763,479 issued Aug. 16, 1988 and assigned to the assignee of the present invention, which is incorporated herein by reference in its entirety.

In accordance with the present invention, the condensate is treated with a small amount of an oxidizing agent. Among the oxidizing agents suitable for use in the present invention are those having at least one

(haloimine) group wherein X is a halogen. Preferred agents have an

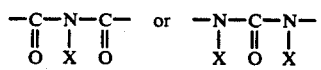

group and the even more preferred agents have a

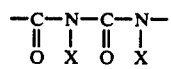

group, wherein in each instance X is the same or different halogen. The preferred halogens are chlorine and bromine. It will be noted that in the particularly preferred agents no two haloimine groups are bonded to one another.

Generally, the oxidizing agents are organic compounds containing the above-described haloimine or haloimine-carbonyl functionality and at least about 3, generally from about 3 to about 20, and preferably from 3 to about 15 atoms other than hydrogen, i.e., carbon, heteroatoms such as S, O, N, etc., and pendant functional groups, e.g., oxy, thioxy, amino, thiol groups and/or organic radicals.

The preferred oxidizing agents of the present invention are characterized by a heterocyclic ring structure comprising carbon and nitrogen atoms. Affixed to the ring structure is at least one and preferably two or more halogen atoms. Thus, the oxidizing agents of the present invention may be described as halogenated-organic oxidizing agents or more specifically, as halogenated-heterocyclic, organic oxidizing agents.

The most preferred oxidizing agent for use in accordance with the present invention comprises a ring structure and may be characterized by the following general formula:

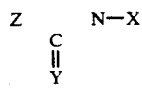

wherein X is a halogen, Y is oxygen or sulfur and Z is a wherein X is a halogen divalent radical of from 3 to 10, preferably 3 to 8, more preferably 3 to 4 atoms in length, forming the ring structure. The ring structure preferably consists of alternate nitrogen and carbon atoms. Typical ring structures are triazine and oxidiazole. Typically, each nitrogen atom of the ring structure is substituted with a halogen. The carbon atoms are generally bonded to one or more members of the group consisting of hydrogen, oxygen, chlorine, bromine and $C_1$ to $C_6$ organic radicals. The organic radicals are preferably aliphatic radicals, more preferably substituted or un-substituted alkyl radicals, and even more preferably un-substituted alkyl radicals having 1 to 3 carbon atoms, with methyl being most preferred. The preferred halogens, based upon their availability, are chlorine and bromine.

A noteworthy aspect of the ring structures of the preferred oxidizing agents is that they include oxycarbonyls adjacent each side of at least one of the halogen-substituted nitrogen atoms. The preferred agents further include a halogen-substituted nitrogen atom adjacent each side of at least one of the oxycarbonyls. Two preferred agents have the following chemical structure:

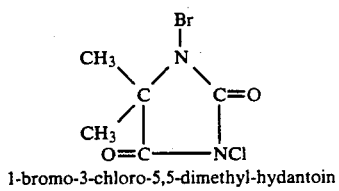
1-bromo-3-chloro-5,5-dimethyl-hydantoin

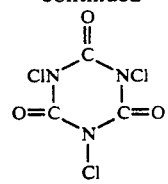
trichloro-isocyanuric acid

It is readily seen that these two structures fulfill the foregoing definitions with respect to the constituents of the ring structure, the preferred halogen, and location of oxycarbonyls relative to halogen substituted nitrogen.

In the invention, the foregoing oxidizing agents are employed in aqueous media, such as geothermal brines, to prevent release of hydrogen sulfide and nitrogen dioxide from precursors thereof in the aqueous media. For a geothermal facility employing the brine as a source of steam, the oxidizing agent preferably is introduced into the brine in the cooling tower or the cooling tower catch basin in a substantially continuous manner. Other introduction methods, including intermittent introduction, however, are considered to be within the scope of the invention.

About two-thirds of the hydrogen sulfide gas, entering the power generating system with the steam, typically passes into the condensate phase in the condensers. This is presumably due to an excess of ammonia in the steam, which increases the solubility of hydrogen sulfide in the condensate by reacting with the hydrogen sulfide to form ammonium bisulfide, according to the reaction:

$$H_2S + NH_3 \xrightarrow{H_2O} NH_4HS \qquad (1)$$

However, it is possible that other hydrogen sulfide precursors (that is, compounds from which hydrogen sulfide may outgas or be released during condensate treatment operations) may be formed in the condensate, and the present invention is not limited to any particular theory of operation.

Without adequate treatment, when the condensate cascades downwardly through the cooling tower, the ammonium bisulfide (or any other hydrogen sulfide precursor present in the condensate) breaks down and releases hydrogen sulfide, which mixes with air and is released into the atmosphere from the cooling tower.

The remaining about one-third of the hydrogen sulfide, in the non-condensable gases leaving the condensers has generally, heretofore, been emitted into the atmosphere. Depending upon the particular geothermal brine, power plant size and hydrogen sulfide content in the geothermal brine, the amount of the hydrogen sulfide emitted into the atmosphere with other gases from the condenser may presently, or in the near future, exceed hydrogen sulfide emission limits in some localities.

In the present invention, the non-condensable gases, containing $H_2S$, are not emitted to the atmosphere, but instead are introduced into a make-up water return conduit at a point well upstream of the cooling tower. In this conduit, there is contained condensate, $H_2S$, $NH_3$ and the oxidizing agent. Most of the hydrogen sulfide reacts with the ammonia in the condensate to form additional ammonium bisulfide, which is oxidized to bisulfate. This abates hydrogen sulfide emission from the non-condensable gases. Even if the sulfide precursor is present as a compound other than ammonium bisulfide, such compound also is oxidized to a sulfate, and $H_2S$ emissions are abated.

The reason geothermal brines in particular, confront one with the difficulty of nitrogen oxide emissions is due to bacteria growing in the cooling tower.

Many types of air-borne organisms have been found to grow at a very rapid rate in the hot, wet environment of cooling tower and condensate catch basin. As an example, among the bacteria usually found in cooling tower and catch basin when ammonium compounds are present are nitrifying bacteria such as Nitrosomonas and Nitrobacter. These bacteria consume ammonia in the cooling tower and produce nitric and nitrous acids which thereby add to system corrosion problems. The acids produce nitrogen dioxide emissions when the condensate contacts iron ions, for example, when the condensate is combined with iron-containing brine in the sump.

Also present are such sulfate-reducing bacteria as autotropic (*Thiobacillus thiooxidans*), the biological action of which, on sulfur in the condensate, tends to add to hydrogen sulfide emissions. Furthermore, the slime formed by most types of bacteria, as well as by algae, tends to cause severe equipment fouling and a subsequent loss of efficiency.

It has been determined that hydrogen sulfide and nitrogen dioxide emissions from, and the growth of organisms in, a cooling tower, catch basin and sump are effectively controlled in an economic manner by the present process.

The oxidizing agent preferably is added to the condensate in a continuous, or substantially continuous manner. One way to accomplish this is to introduce a stream containing the agent (in a solid or liquid form) in a relatively small concentration into the condensate in a continuous, or at least a substantially continuous, manner. Preferably it is introduced at a rate effective for substantially eliminating the emission of hydrogen sulfide and nitrogen dioxide, but without substantially inhibiting the growth of living organisms. An alternative way to accomplish continuous, or substantially continuous, introduction is by periodically adding a slowly-dissolving pellet or pellets of solid oxidizing agent into the cooling tower or catch basin.

In the preferred embodiment, the oxidizing agent is added to the condensate on a continuous basis in an amount sufficient to abate emissions of nitrogen oxides, particularly nitrogen dioxide, and hydrogen sulfide. In general the amount so needed does not substantially inhibit the growth of algae, fungi and bacteria in the cooling tower and/or catch basin. Although greater quantities of the oxidizing agent could be continuously added to the condensate to completely inhibit the growth of organisms in the cooling tower and catch basin, the resulting process would be excessively expensive. Further, it is not considered essential, in the present invention, to continuously control the growth of the organisms in the system.

It is preferred to control the growth of these organisms on a periodic basis by adding to the condensate a relatively large, "shock" amount of a biocide on a weekly or monthly basis. The periodic shock treatment results in an increasing organism concentration, permitted by the continuous addition to the condensate of only small amounts of the oxidizing agent, followed by a rapid decrease in the concentration of organisms caused by the periodic addition of a large amount of the biocide. The periodic shock treatment typically reduces the total organism concentration from a high value (1 to 10 million/liter) to under 10,000/liter. Thus, the treatment provides at least a 90 percent and generally at least about a 99 percent reduction in the organisms concentration.

The described process of periodically adding significant amounts of the biocide to the condensate has been found to be more cost effective than continually adding a larger amount of the oxidizing agent or a biocide to constantly control the growth of organisms.

As can be appreciated, the actual amounts of the biocide and the intervals between its addition depend upon the organism growth characteristics, which may, in turn, depend upon such factors as the geographic location of power plant, the temperature in the cooling tower and catch basin, and the type(s) of organisms present. However, the amounts and intervals can be readily determined for a particular cooling tower and catch basin by the simple expedient of measuring the live bacteria count therein from time to time. Preferred, however, are additions of sufficient biocide which allow for intervals of between about 1 and about 4 weeks.

The shock biocide can be the same as the oxidizing agent. Based on cost, however, it is preferred that it be a non-oxidizing biocide and that it be selected from dodecylguanidine hydrochloride, isothiazalone, and mixtures thereof.

A corrosion inhibitor, which is preferably a non-heavy metal inhibitor selected from an inorganic phosphate passivator and scale dispersant, such as Betz Dianodic II, may be added to the condensate in the cooling tower, catch basin or both. It is preferred that the corrosion inhibitor be added to the condensate in a concentration between about 10 and about 50, and more preferably a concentration of between about 18 and about 28, PPMW relative to the condensate.

As used herein, the concentration notation "PPMW relative to the condensate" (regardless of the additive material involved) is to be understood to mean the concentration of the added material (whether it is fully dissolved, partially dissolved or not dissolved at all) in parts per million by weight relative to the total volume of the condensate handling system, including condensers, cooling tower, catch basin, sums and conduits. This is the case even though condensate is continually being added from condensers and condensate is continually being removed by evaporation in the cooling tower. Also, the biocide added does not go into solution immediately. Thus, an extracted sample of the condensate would generally not actually have the stated concentration of the added material. Such a designation for concentration of added, partially dissolved materials is, however, consistent with the standard practices followed in the water treatment industry.

If the oxidizing agent were to oxidize all the sulfide and nitrite in the steam condensate to a sulfate and nitrate, respectively, by direct chemical reaction, one would expect to need at least a stoichiometric amount of the oxidizing agent. For example, for trichloroisocyanuric acid and hydantoin biocides, respectively, the stoichiometric amount would be in accordance with the following reactions:

$$3NH_4HS + 4C_3N_3O_3Cl_3 + 12H_2O \rightarrow 3NH_4HSO_4 + 4C_3H_3N_3O_3 + 12HCl \quad (2)$$

$$NH_4HS + 2C_5H_6N_2O_2BrCl + 4H_2O \rightarrow NH_4HSO_4 + 2C_5H_8N_2O_2 + 2HBr + 2HCl \quad (3)$$

$$3 HNO_2 + 4 C_3N_3O_3Cl_3 + 3 H_2O \rightarrow 3 HNO_3 + C_3H_3N_3O_3 + 3 HCl \quad (4)$$

$$2 HNO_2 + C_5H_6N_2O_2BrCl + 2 H_2O \rightarrow 2 HNO_3 + C_5H_8N_2O_2 + HBr + HCl \quad (5)$$

with other acids such as hydrochloric and hydrobromic acids also being possibly formed. By similar reactions (not shown) the trichloro-isocyanuric acid and hydantoin biocides also would be expected to oxidize the ammonium bisulfite in the condensate to ammonium sulfate.

Since geothermal brines contain substantial quantities of oxidizable species such as arsenic, etc., one would normally expect that, if only direct oxidation reactions were responsible for the abatement of $H_2S$ and $NO_x$, one would need to add at least the stoichiometric amount of oxidant for conversion of all oxidizable species in order to ensure that no hydrogen sulfide and nitrogen oxides were released from the brine.

However, it has been surprisingly found that far less than the stoichiometric amount for oxidizing all species is required to obtain excellent results. For example, for a Salton Sea geothermal brine, an effective amount was found to be within the range of from about 0.1 to about 0.5 percent of the theoretical stoichiometric amount required for oxidation of all oxidizable species present in the brine.

It also was expected that the amount of oxidizing agent required to prevent the emission of hydrogen sulfide and nitrogen dioxide from the condensate would be at least the stoichiometric amount required for oxidizing all sulfides and nitrites in the brine to their corresponding sulfates and nitrates. It was, however, unexpectedly and surprisingly discovered that the amount of oxidizing agent needed to reduce both hydrogen sulfide and nitrogen dioxide emissions by in excess of 70 percent, generally in excess of 80 percent, and preferably in excess of about 90 percent and more preferably in excess of about 95 percent, is only an extremely small percentage (for example, only about 0.05 to about 0.1 percent) of the stoichiometric amount of oxidizing agent for conversion of just the sulfides alone. In addition, these small amounts also concurrently convert arsenious acid to a less toxic, stable compound (as taught in parent application U.S. Ser. No. 07/473,226).

Why only such a very small amount of oxidizing agent is needed to completely control hydrogen sulfide and nitrogen dioxide emissions from the cooling tower and catch basin is not completely understood. Apparently, the agent (possibly in conjunction with the small amounts of some materials, such as iron, carried over into the condensate from the geothermal brine) functions as a catalyst in the oxidation reactions. Oxygen in the condensate, for example, from air picked up as the condensate cascades through the cooling tower could react with the bisulfide and nitrite in accordance with the following reactions:

$$NH_4HS + 2O_2 \xrightarrow{Cat.} NH_4HSO_4 \quad (6)$$

-continued
$$NO^-_2 + \tfrac{1}{2}O_2 \xrightarrow{Cat.} NO^-_3 \quad (7)$$

The theory that a catalytic reaction is somehow involved is borne out by the observation that much less oxidation of the sulfide and nitrite in the condensate occurs in the absence of small amounts of the oxidizing agent. It is, of course, to be understood that the present invention is not to be held to this or to any other theory of operation.

If a stoichiometric amount of oxidizing agent, to oxidize all the oxidizable species in the condensate, was required to ensure abatement of $H_2S$ and $NO_2$ emissions, the present process would not be economically attractive. Indeed, even if the stoichiometric amount for just sulfide or nitrite oxidation was required, the cost for the required quantity of oxidizing agent would be economically prohibitive. However it has been discovered that less than a few percent, and generally even less than one percent, of the stoichiometric amount for just the sulfides or nitrites effectively abates $H_2S$ and $NO_2$ emissions. Thus, the invention provides a cost effective process. This and other advantages of the present invention will be more apparent with reference to the following Example.

EXAMPLE

A two-phase mixture of a Salton Sea geothermal brine and steam, at a wellhead temperature of about 450° F. and a wellhead pressure of about 450 psig, is extracted at a rate of about one million pounds per hour from a brine production well. The two-phase mixture has a hydrogen sulfide concentration of about 10 PPMW, an ammonia concentration of about 350 PPMW, and a carbon dioxide concentration of 2000 PPMW (relative to the two-phase mixture from the well).

The two phase mixture is flashed to produce about 180,000 to 220,000 pounds per hour of steam which is supplied to a steam turbine. The steam includes about 10 pounds per hour of hydrogen sulfide (as a non-condensable gas), about 1600 pounds per hour of carbon dioxide, and about 50 pounds per hour of ammonia, also as non-condensable gases.

After exiting the turbine, the steam is condensed and about 7 pounds per hour of the hydrogen sulfide enters the condensate to form ammonium bisulfide. About 47 pounds per hour of the ammonia enters the condensate to form ammonium carbonate. The condensate has a pH of about 9.0 and contains about 0.5 PPMW of oxidizable arsenic.

Betz Dianodic II corrosion inhibitor is added to the condensate in a catch basin to provide an inhibitor concentration of between about 18 and about 28 PPMW relative to the condensate.

Between about 1 and about 4 pounds per day of oxidizing agent (1-bromo-3-chloro-5,5-dimethyl-hydantoin) is added to the condensate in the catch basin to provide a concentration of between about 1 and about 4 PPMW relative to the condensate. The agent is added in the form of one or more pellets, weighing about 0.6 pounds each, which slowly dissolve in the condensate over about a 24-hour period. Since steam is provided at a rate of between about 4.32 million and about 5.28 million pounds in a 24-hour period, the oxidizing biocide is added to the condensate at a rate which can be considered to be between about 0.18 and about 0.93 PPMW relative to the flow of steam.

With the addition of between about 1 and about 4 pounds of oxidizing biocide a day into the condensate, the formation of nitrite in the cooling tower and catch basin is essentially eliminated. This completely eliminates the potential for NO$_2$ emission when the condensate mixes with the brine in a sump prior to disposal in a dedicated injection well.

The stoichiometric amount of the above-mentioned hydantoin oxidizing agent required, in accordance with reaction (5), to oxidize all the nitrite in the condensate formed from 47 pounds per hour of ammonia is calculated to be about 13 pounds per hour, or about 300 pounds per day. The amount of hydantoin oxidizing agent actually required to substantially eliminate the nitrite from the condensate (based solely on the nitrite content) is between about 0.3 and about 1.3 percent of the stoichiometric amount of oxidizing agent expected to be required.

The emission of hydrogen sulfide from the cooling tower and catch basin is about 3 pounds per hour. This emission results from the discharge of hydrogen sulfide gas from the condenser into the cooling tower.

The stoichiometric amount of hydantoin biocide required, in accordance with Reaction (3), to oxidize all of the ammonium bisulfide in the condensate is calculated to be about 66 pounds per hour, or about 1590 pounds per day. The amount of the hydantoin actually required to substantially abate the emission of hydrogen sulfide from the condensate is between about 0.063 and about 0.25 percent of the stoichiometric amount expected to be required for the bisulfide alone.

When the non-condensable gases (containing about 3 pounds per hour of hydrogen sulfide) are combined with the condensate, excellent abatement of all hydrogen sulfide from the cooling tower and catch basin is still achieved with the addition to the condensate of no more than the above-mentioned amount of between about 1 and about 4 pounds per hour of hydantoin.

If all the hydrogen sulfide were oxidized by a stoichiometric amount of the hydantoin, about 96 pounds per hour (2260 pounds per day) would be required. Instead, only about 0.044 to about 0.18 percent of the stoichiometric amount of the hydantoin is found to abate substantially all the hydrogen sulfide emission. In addition this seemingly almost insignificant amount concurrently abated substantially all NO$_x$ emissions and oxidized substantially all the arsenic in the condensate to less toxic arsenates.

Isothiazalone is used as the organism control biocide and is added to the condensate in the catch basin about every two weeks in an amount sufficient to provide a concentration of about 50 PPM relative to the condensate.

The addition of the above-described amounts of the hydantoin oxidizing agent and Isothiazalone biocides is found to effectively control the growth of organisms in the cooling tower and catch basin.

There has been described above a preferred embodiment of the invention for controlling the emission of hydrogen sulfide and nitrogen dioxide from, and the growth of organisms such as algae, fungi and bacteria in, a system for handling a condensate of steam derived from a geothermal brine for the purpose of illustration. It will be appreciated that the invention is not limited to this illustrative example. The invention may be used in any facility producing sulfide and nitrite containing aqueous streams. Accordingly, many process modifications and variations may occur to those skilled in the art and still be within the scope of the invention as defined by the appended claims.

What is claimed is:

1. A process for treating an aqueous solution containing oxidizable sulfur and nitrogen compounds to prevent emission of hydrogen sulfide and nitrogen oxides therefrom comprising introducing a liquid or solid oxidizing agent into the aqueous solution in an amount less than the stoichiometric amount which theoretically would be required to oxidize substantially all the sulfur and nitrogen compounds to sulfates and nitrate, said amount being between about 0.5 and 20 ppmw.

2. The process of claim 1 wherein the solution contains bisulfide and nitrite and the amount of oxidizing agent is sufficient to result in conversion of substantial amounts of bisulfide and nitrite to bisulfate and nitrate, respectively.

3. The process of claim 2 wherein the oxidizing agent comprises trichloro-isocyanuric acid.

4. The process of claim 2 wherein the oxidizing agent is an oxidizing biocide, the amount is less than about 0.5 percent of said stoichiometric amount and the aqueous solution is derived from a geothermal brine.

5. The process of claim 1 wherein the oxidizing agent is selected from the group consisting of trichloro-isocyanuric acid and salts thereof, 1-bromo-3-chloro-5,5-dimethyl-hydantoin and other halogenated substituted hydantoins, and mixtures thereof.

6. A process for treating a condensate of steam, derived from an aqueous condensate containing oxidizable sulfur and nitrogen species, said process comprising introducing a halogenated-organic, oxidizing agent into the condensate in an amount less than the stoichiometric amount required to oxidize all the oxidizable sulfur and nitrogen species to their corresponding sulfates and nitrates, and the oxidizing agent includes at least one

group, wherein X is a halogen.

7. The process of claim 6 wherein the aqueous condensate is derived from a geothermal brine.

8. The process of claim 7 wherein the oxidizing agent contains at least one

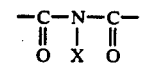

group.

9. The process of claim 7 wherein the oxidizing agent contains at least one

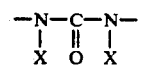

group.

10. The process of claim 7 wherein the oxidizing agent contains at least one

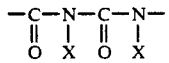

group.

11. The process of claim 10 wherein the oxidizing agent consists of elements selected from the group consisting of nitrogen, hydrogen, carbon, oxygen, bromine and chlorine.

12. The process of claim 11 wherein each carbon atom of the agent is bonded to a member selected from the group consisting of hydrogen, oxygen, chlorine, bromine and $C_1$-$C_6$ organic radicals.

13. The process of claim 12 wherein the oxidizing agent comprises a heterocyclic ring having from 5 to 6 atoms in the ring.

14. The process of claim 7 wherein said oxidizing biocide has the general formula:

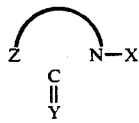

wherein X is a halogen, Y is oxygen or sulfur and Z is a divalent radical of from 3 to about 8 atoms in length.

15. The process of claim 14 wherein the agent comprises a ring structure which consists of alternate carbon and nitrogen atoms.

16. The process of claim 15 wherein the amount of oxidizing agent is in the range of from about 0.01 to 0.5 percent of the stoichiometric amount required for direct oxidation of all the oxidizable sulfur and nitrogen species to their corresponding sulfates and nitrates.

17. The process of claim 16 wherein the condensate is derived from a Salton Sea type geothermal brine.

18. The process of claim 16 wherein the condensate is derived from a Salton Sea type geothermal brine.

19. A process for use in a system for handling a flow of condensate of steam, the condensate containing oxidizable sulfur species selected from the group consisting of hydrogen sulfide, hydrogen sulfide precursors, nitrites, and mixtures thereof, the process controlling the emission of hydrogen sulfide and nitrogen oxides from, and a concentration of one or more organisms selected from the group consisting of fungi, algae and bacteria growing in, the condensate handling system, the process comprising the steps of:

(a) introducing into the condensate, in a substantially continuous manner, an amount of an oxidizing agent which substantially prevents the emission of hydrogen sulfide and nitrogen oxides, but which does not substantially inhibit the growth of said organisms, said oxidizing agent having at least one

group wherein X is a halogen; and (b) periodically introducing a biocide into the condensate in an amount which substantially reduces the concentration of said organisms.

20. The process of claim 19 wherein the oxidizing agent contains at least one

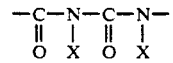

group.

21. The process of claim 20 wherein the oxidizing agent consists of elements selected form the group consisting of nitrogen, hydrogen, carbon, oxygen, bromine and chlorine.

22. The process of claim 21 wherein each carbon atom is bonded to a member selected from the group consisting of hydrogen, oxygen, chlorine, bromine and $C_1$-$C_6$ organic radicals.

23. The process of claim 22 wherein the oxidizing agent comprises a heterocyclic ring having from 5 to 6 atoms in the ring.

24. The process of claim 19 wherein said condensate is derived from a geothermal brine and said oxidizing agent has the general formula:

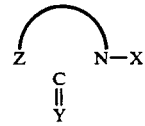

wherein X is a halogen, Y is oxygen or sulfur and Z is a divalent radical of from 3 to about 8 atoms in length.

25. The process of claim 24 wherein the agent comprises a ring structure which consists of alternate carbon and nitrogen atoms.

26. The process of claim 25 wherein Z is 3 to 4 atoms in length.

27. The process of claim 24 wherein the amount of oxidizing agent is in the range of from about 0.2 to 2 percent of the stoichiometric amount required for direct oxidation of all the oxidizable sulfur and nitrogen species.

28. The process of claim 27 wherein the biocide is added to the condensate in the amount between about 25 and 200 PPMW relative to the condensate at intervals of between about 1 and about 4 weeks.

29. The process of claim 24 wherein the condensate is derived from a Salton Sea type geothermal brine.

30. A process comprising substantially eliminating the emission of hydrogen sulfide and nitrogen dioxide from a system handling aqueous liquids containing oxidizable sulfur and nitrogen components by adding an oxidizing agent in an amount theoretically insufficient to directly oxidize all the oxidizable sulfur and nitrogen components to sulfates and nitrates, but which is sufficient to result in oxidation of substantially all the sulfur and nitrogen components to sulfates and nitrates.

31. The process of claim 30 wherein the oxidizing agent comprises a heterocyclic ring having from 5 to 6 atoms in the ring.

32. The process of claim 31 wherein the sulfur components comprise a bisulfide and the nitrogen components comprise a nitrite.

33. The process of claim 32 wherein the amount of oxidizing agent is substantially less than the stoichiometric amount required to oxidize all the bisulfide to bisulfate and the nitrite to nitrate.

34. A process for treating a condensate of steam derived from an aqueous brine, said condensate containing sulfide and nitrite and a concentration of one or more organisms selected from the group consisting of algae, fungi and bacteria comprising introducing into said condensate a halogenated, organic, oxidizing agent in an amount insufficient to substantially inhibit an increase in the concentration of said organisms, but sufficient to result in oxidation of substantially all the sulfide to sulfate and the nitrite to nitrate.

35. The process of claim 34 wherein the amount of oxidizing agent is less than the stoichiometric amount required to directly oxidize all the sulfide to sulfate and the nitrite to nitrate.

36. The process of claim 35 wherein the amount of oxidizing agent is in the range of from about 0.01 to 10 percent of the stoichiometric amount.

37. The process of claim 35 wherein the aqueous brine is a Salton Seatype geothermal brine.

38. The process of claim 37 wherein said oxidizing agent has the general formula

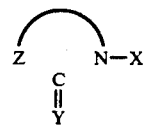

wherein X is a halogen, Y is oxygen or sulfur and Z is a divalent radical of from 3 to about 8 atoms in length.

39. The process of claim 38 wherein the agent comprises a ring structure in which the ring-forming atoms consist of alternate carbon and nitrogen atoms.

* * * * *

UNITED STATES PATENT AND TRADEMARK OFFICE
CERTIFICATE OF CORRECTION

PATENT NO. : 5,167,834                                    Page 1 of 2

DATED      : 12/1/92

INVENTOR(S): Gallup et al.

It is certified that error appears in the above-identified patent and that said Letters Patent is hereby corrected as shown below:

Claim 14, column 13, line 19, replace "biocide" with -- agent --; lines 21-25 replace formula with

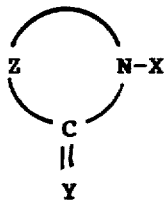

Claim 17, column 13, line 38, delete "Seatype" and insert therefor -- Sea type --.

Claim 18, column 13, line 39, delete "16" and insert therefor -- 6 --.

Claim 24, column 14, lines 21-28, replace formula with:

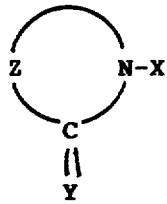

UNITED STATES PATENT AND TRADEMARK OFFICE
CERTIFICATE OF CORRECTION

PATENT NO. : 5,167,834

DATED : 12/1/92

INVENTOR(S) : Gallup et al.

It is certified that error appears in the above-identified patent and that said Letters Patent is hereby corrected as shown below:

Claim 29, column 14, line 46, delete "Seatype" and insert therefor -- Sea type --.

Claim 37, column 16, line 2, delete "Seatype" and insert therefor -- Sea type --.

Claim 38, column 16, lines 5-10, replace the formula with:

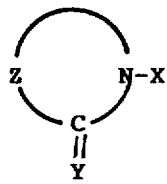

Signed and Sealed this

Twenty-first Day of December, 1993

BRUCE LEHMAN

*Attesting Officer*   *Commissioner of Patents and Trademarks*